UNITED STATES PATENT OFFICE.

GEORG HEINRICH SEITZ AND FRIEDRICH SCHMITTHENNER, OF KREUZNACH A. D. VAHE, GERMANY, ASSIGNORS TO THE FIRM OF SEITZ-WERKE, THEO. & GEO. SEITZ, OF KREUZNACH A. D. VAHE, GERMANY.

FILTER-BODY.

1,256,171.      Specification of Letters Patent.     Patented Feb. 12, 1918.

No Drawing.     Application filed March 10, 1917. Serial No. 154,057.

*To all whom it may concern:*

Be it known that we, GEORG HEINRICH SEITZ and FRIEDRICH SCHMITTHENNER, both citizens of the German Empire, and residents of Kreuznach a. d. Vahe, Germany, have invented new and useful Improvements in Filter-Bodies, of which the following is a specification.

For the removal of germs from liquids by filtration, the heretofore known process utilized variously formed filter bodies (plates, tubes, taper-pipes) which are all composed of inorganic substances and are brought in the desired form under the use of suitable binders and are dried in the fire (kiln dried). However, these filter bodies have the defect that their quantitative capacity is small and by reason of their limited permeability require very large plants if large quantities of the filtrate are desired. In addition, they must, if used as continuous filter bodies, be cleaned at shorter or longer intervals, first mechanically (for instance by means of brushes) and secondly by extended sterilization or evaporation in order to kill the germs which have grown into the pores. Practical experience has shown that this often needed cleaning process and in particular the sterilization of these filter bodies is very inconvenient and frequently also insufficient by reason of the lack of understanding on the part of the public of the importance of sterilization.

A further disadvantage of these known continuous filter bodies is finally to be found in the fact that they wear down in the course of time in consequence of the mechanical cleaning and become less apt to hold the germs back.

Another cause of inconvenience, especially when portable filters are concerned, is their comparatively great weight and their fragility.

It has been found that it is possible to produce filter bodies which are sterile in themselves and adapted to retain all germs from the liquid to be filtered and which do not show any of the defects referred to.

These results are obtained, when, in accordance with the present invention, inorganic filter bodies are used in combination with organic fibers. Some of the inorganic bodies which may be used are infusorial earth, kaolin and asbestos and among the organic fibers, cotton, flax, cellulose, and jute. The proportion of the mixture depends upon the nature of the materials used, but the following data may be given as examples.

Thus for instance 50% infusorial earth, 25% flax and 25% cotton or 80% asbestos and 20% cellulose may be used.

This mixture is brought into the form of a paste with the help of water or any other suitable liquid; for instance 70 parts of water to 1 part of the mixture referred to are used. The material becomes by removing the water, well felted into the form of plates, tubes, tapers or the like, which are dried at a temperature of about 60° C. and afterward subjected to a germ-killing temperature of about 120° C. The germ-killing heat is applied while the bodies are packed in germ-proof covers, such as covers of parchment. These germ-proof covers keep the filter bodies continuously germ-proof until they are used, when the covers are removed. Filter bodies prepared in this manner deliver an absolutely germ free filtrate under very high quantitative capacity for a term of several days.

When the filter bodies are daily replaced by new ones, the danger of the germs growing through is completely excluded. The daily renewal of the interchangeable filter bodies is in addition much more economical than the use of the above described continuous filter bodies, because the former can be very cheaply produced by reason of their simple construction. A particularly important advantage of this sterile filter layer is the elimination of all cleaning and sterilization on the part of the filter attendant, because they are, as stated above, simply removed after having been in use for a short while and replaced by new ones; the result of the filtration is therefore not dependent upon the more or less careful work of the operator and a continuously uniform surety is granted for a bacteriologically perfect operation of the filter. Finally, by the utilization of such interchangeable filter layers the disagreeable possibility that the mechanical cleaning may reduce the impermeability of the filter bodies is removed. Contrary to the continuous filter bodies, these interchangeable filter bodies are unbreakable and of inconsiderable weight, so that they can be carried along with portable filters in large numbers without requiring a great deal of space. Desiccating after deposit and felting of the substances is of essential importance for the present process, because layers deposited of equal quantities of the same material and utilized in moist condition are unable to yield a germ-free filtrate. Essential too, is the temperature at which the sterilization of the bodies takes place. Too high a temperature would burn and injure the organic component of the filter layer, while at a temperature, which is too low, the sterilization of the filter bodies would be incomplete. Essential too, is the temperature at which the layers are dried.

It is to be remarked that when producing the mixture or paste of the materials, instead of pure water, water containing a suitable disinfecting medium, such as formalin or pure alcohol or the like, may be used. The disinfecting medium will, when the mass is heated, be evaporated and thus removed again.

When instead of water pure alcohol is used for mixing the material into the form of a paste, obviously no disinfecting medium is needed, as the alcohol itself acts as a disinfecting medium.

Now what we claim and desire to secure by Letters Patent is the following:

1. A process for forming a filter body for the removal of germs from liquids, consisting in mixing infusorial earth, flax and cotton in a watery solution, to which formalin has been added, so as to form a paste, felting the mass by removing the water and drying it, and finally forming it into a filter body and sterilizing the body in a germ-proof covering at a suitable temperature, substantially as described.

2. A process for forming a filter body for the removal of germs from liquids, consisting in mixing infusorial earth, flax and cotton in a watery solution, to which formalin has been added, so as to form a paste, felting the mass by removing the water and drying it at a temperature of about 60° C. and finally forming it into a filter body and sterilizing the body in a germ-proof covering of parchment at a temperature from about 120°–150° C., substantially as described.

That we claim the foregoing as our invention, we have signed our names this 26th day of January, 1917.

GEORG HEINRICH SEITZ.
DR. FRIEDRICH SCHMITTHENNER.